(12) United States Patent
Arai et al.

(10) Patent No.: US 6,552,861 B1
(45) Date of Patent: Apr. 22, 2003

(54) OPTICAL GUIDE FIXTURE

(76) Inventors: Mikki Arai, 16 April La., Lexington, MA (US) 02421; Tatuso Hirose, 8 Whittier Pl. #12H, Boston, MA (US) 02114

( * ) Notice: Subject to any disclaimer, the term of this patent is extended or adjusted under 35 U.S.C. 154(b) by 0 days.

(21) Appl. No.: 09/693,557

(22) Filed: Oct. 20, 2000

Related U.S. Application Data

(63) Continuation-in-part of application No. 09/497,918, filed on Feb. 4, 2000, now Pat. No. 6,166,857, which is a continuation-in-part of application No. 09/425,256, filed on Oct. 22, 1999, now abandoned.

(51) Int. Cl.[7] .................... G02B 27/02; H04N 1/024; H04N 7/18; G01R 31/00
(52) U.S. Cl. .................. 359/806; 359/894; 359/645; 359/367; 359/369; 359/436; 356/600; 358/473; 348/63; 324/96
(58) Field of Search ................ 359/806, 894, 359/819, 645, 367, 368, 369, 379, 436, 438, 509; 356/600; 358/473; 348/63, 373, 376; 425/7; 324/96

(56) References Cited

U.S. PATENT DOCUMENTS

| | | | |
|---|---|---|---|
| 1,487,173 A | 3/1924 | Manion | |
| 1,518,419 A | 12/1924 | Styll | |
| 2,451,014 A | 10/1944 | Zworykin et al. | 250/41.5 |
| 2,420,716 A | 5/1947 | Morton et al. | 250/41.5 |
| 2,850,404 A | 11/1955 | Dunlap | 117/44 |
| 3,119,185 A | 1/1964 | Gray | 33/46 |
| 3,766,473 A | 10/1973 | Fleetman | 324/96 |
| 3,993,865 A | 11/1976 | Browne et al. | 178/7.6 |
| 4,136,361 A | 1/1979 | Doan | 358/94 |
| 4,206,978 A | 6/1980 | Leopoldi | 359/819 |
| 4,261,204 A | 4/1981 | Donaldson | 73/864.73 |
| 4,330,169 A | 5/1982 | Kantor | 359/369 |
| 4,621,283 A | 11/1986 | Feinbloom | 358/93 |
| 4,639,097 A | 1/1987 | Teske et al. | 359/367 |
| 4,797,736 A | 1/1989 | Kloots et al. | 358/93 |
| 4,917,462 A | 4/1990 | Lewis et al. | 359/368 |
| 5,028,941 A | 7/1991 | Sohn | 354/75 |
| 5,046,163 A | 9/1991 | Priest et al. | 348/63 |
| 5,239,759 A | 8/1993 | Dudek | 33/42 |
| 5,244,369 A | 9/1993 | Miller et al. | 425/7 |
| 5,656,280 A | 8/1997 | Herb et al. | 424/401 |
| 5,724,139 A | 3/1998 | Guerra | 356/600 |
| 5,745,177 A | 4/1998 | Lamoure | 348/373 |
| 5,777,715 A | 7/1998 | Kruegle et al. | 351/158 |
| 5,833,524 A | 11/1998 | Satoh et al. | 451/456 |

FOREIGN PATENT DOCUMENTS

EP 0 580 261 A1 1/1994

*Primary Examiner*—Loha Ben
(74) *Attorney, Agent, or Firm*—Foley Hoag LLP

(57) ABSTRACT

The present invention provides an optical guide fixture for coupling visual information on a surface to a viewer. The optical guide fixture of the invention can be coupled to an optical receiver, such as a digital camera, operably connected to a head-mounted display unit to provide a device according to the invention for viewing a surface. Such a device, in one application, provides magnified images of visual information on a surface, such as a page of a book, to a patient with a visual impairment.

33 Claims, 11 Drawing Sheets

OPTICAL GUIDE FIXTURE

RELATED APPLICATION

This application is a continuation-in-part of the commonly assigned and application entitled OPTICAL GUIDE FIXTURE, Ser. No. 09/497,918, filed Feb. 4, 2000, now U.S. Pat. No. 6,166,857, which is a continuation-in-part of the commonly assigned application entitled OPTICAL GUIDE FIXTURE, Ser. No. 09/425,256, filed Oct. 22, 1999, now abandoned. The specification of application Ser. No. 09/497,918 is hereby incorporated by reference in its entirety.

BACKGROUND OF THE INVENTION

The present invention relates to an optical guide fixture for coupling visual information on a surface to an optical viewer. More particularly, the invention provides an apparatus having such an optical guide fixture for convenient viewing of visual information present on a surface.

A number of devices are known for assisting an individual having a visual impairment to view visual information, such as text and graphics, on a surface. Some such devices employ a scanner, such as a mouse-like device, having an optical receiver therein to obtain data corresponding to the visual information on the surface, and to transmit the data to a closed circuit television (CCTV) to be viewed on a television monitor. For example, U.S. Pat. No. 5,046,163 describes such a device. Such conventional devices are typically bulky, and hence are not easily portable. Further, an individual employing such a device can not easily determine which portion of the surface is being shown on the monitor because the scanner partially obstructs the surface. In addition, the scanner of such a device is typically bulky and hence is not suitable for scanning areas of the surface that are not easily accessible, such as the border areas between two adjacent pages of a book.

Another conventional system includes a head-mounted display unit coupled to a camera for viewing visual information on a surface. Such a system typically does not provide a mechanism for conveniently aiming the camera at a selected portion of the surface. This can lead to confusion, especially for a visually impaired patient, regarding which portion of the surface is being viewed. In addition, a person other than the viewer can not easily determine which portion of the surface is being viewed. This is particularly disadvantageous in an educational setting, for example, where an instructor is helping a patient read a book. In addition, such systems are typically heavy, and are cumbersome to wear.

Another conventional system, described in U.S. Pat. No. 4,330,169, includes a scanning head coupled to a bundle of optical fibers. A visually impaired individual views a portion of a surface bearing visual information by looking through a telescope that is coupled to the optical fibers. The scanning head of this device has a relatively narrow field of view. Further, the field of view of the fibers and that of the scanning head are different. Further, the scanning head of this patent is rotationally symmetric, thereby rendering rotational alignment of the scanning head relative to the surface and/or guided translation of the scanning head along a selected direction over the surface difficult. Another defect of the system of the '169 patent is that the telescope does not follow the movements of the patient's head. Accordingly, the patient must keep the head stationary relative to the telescope in order not to lose the view of the surface. This can lead to fatigue and renders viewing of the surface over a long period inconvenient.

An optical scanning instrument designed to alleviate some of these concerns would be advantageous to many people with vision impairment.

SUMMARY OF THE INVENTION

The present invention provides an optical guide fixture that is adapted for coupling visual information on a surface to an optical receiver having a field of view. An optical guide fixture may comprise a pedestal coupled to an optical output window and/or a mount for an optical receiver having an output window. The term "window" as used herein refers to both an optical opening and to an optical aperture having an optically transparent material. The pedestal may have a base configured for manual translation across a surface, such that the output window and/or mount is maintained at a substantially constant distance and angle with respect to the surface. The field of view preferably does not include any opaque portions of the pedestal.

In certain embodiments, the field of view is visible external to the optical fixture. In one such embodiment, for example, the pedestal may be formed, at least in part, of an optically transmissive material, such as clear plastic or glass. In a further illustrative embodiment, the pedestal may provide an opening or aperture that permits external viewing of the field of view. In yet another embodiment, the pedestal includes a substantially skeletal structure, such as a tripod, that does not substantially obstruct the field of view, and/or the field of view may be substantially adjacent to the pedestal.

In certain embodiments, the optical fixture may be configured such that an implement, such as a stylus or pointer, external to the optical fixture may be introduced into or removed from the field of view. For example, the field of view may lie substantially external to the pedestal. Alternatively, the field of view may lie substantially internal to the pedestal, and the pedestal may comprise an aperture, such as an opening or gap, or the pedestal may comprise a substantially skeletal structure, such as a tripod. In such embodiments, the user can interact with the input window, e.g., with a writing implement, pointer, or other object, while the device is in use.

The pedestal of the optical fixture may be of any of various shapes. One common shape is tubular, and can be of constant cross-section or of varying cross-section, as in a cone or funnel shape. Further, the pedestal may have manually engageable guide elements that are mounted with the pedestal and are adapted for disposing the pedestal of the optical fixture on the surface with the field of view in selected placement and selected rotational alignment on the surface. The manually engageable guide elements can form a single, integral unit with the pedestal, or alternatively can be formed as a separate structure for attachment to the pedestal.

According to another aspect, the manually engageable guide elements of the optical fixture may include a handle region on the outer surface of the pedestal of the fixture. The handle region can include a manually perceptible surface irregularity, such as a flat portion, for positioning the fixture with a selected rotational alignment on a surface bearing visual information, and for manually guided translation of the optical fixture in a selected direction on the surface.

In certain embodiments, the optical axis of the optical output window and/or optical receiver is substantially collinear with the central axis of the pedestal. For example, the pedestal may have opposed ends, where each end forms an optical window. The two windows of the optical guide fixture may be in optical communication with each other, and be spaced apart by a predetermined distance along an optical axis. An input window of the optical fixture may be adapted for manually guided translation along the surface on which the visual information resides, and an output window of the fixture may be adapted for coupling with an optical receiver so that the receiver can receive optical information present at the input window. In certain such embodiments, the pedestal of the optical guide fixture may be hollow to provide an optical path along the optical axis for optical communication between the input and the output windows of the fixture. In another such embodiment, the pedestal of the fixture can be solid, and can be formed of an optically transparent material, such as clear plastic or glass.

According to another aspect of the invention wherein the optical axis of the optical output window and/or optical receiver is substantially collinear with the central axis of the pedestal, at least a portion of the pedestal of the optical guide fixture may have a cross-section, transverse to the optical axis of the fixture, that progressively increases in size along the optical axis so that the input window is larger than the output window. In one embodiment of the optical guide fixture, this cross-section is circular and the portion of the fixture having this circular cross-section has a conical shape. In one embodiment, the pedestal of the optical fixture may have a skeletal structure, such as a tripod.

In certain embodiments wherein the optical axis of the optical output window and/or optical receiver is substantially collinear with the central axis of the pedestal, the pedestal of the optical guide fixture, when the input window is placed on a surface, forms a closed space. In certain other related embodiments, the pedestal includes at least one aperture, gap, or space through which an implement may be inserted when the input window is placed on a surface. In other words, when the pedestal is placed on a surface, an object may be removably and replaceably passed from outside the fixture into the optical passage within the fixture.

In accordance with another aspect of the invention, the optical guide fixture may include an optical receiver, such as a digital camera, coupled to the output window of the fixture, i.e., the window opposite to the input window, which, in turn, is adapted for positioning on a surface bearing visual information. The optical receiver may have a predetermined focal length and be coupled to the optical fixture such that it is spaced from the input window, and thereby from the surface, by a distance substantially equal to the focal length.

The optical receiver provides an image of a portion of the surface that is within the field of view of the receiver. In embodiments wherein the optical axis of the optical output window and/or optical receiver is substantially collinear with the central axis of the pedestal, the optical receiver may be selected to have a field of view corresponding to the field of view of the input window of the fixture.

In certain embodiments wherein the optical axis of the optical output window and/or optical receiver is substantially collinear with the central axis of the pedestal, another aspect of the invention couples an optical receiver to the output window of the fixture, and further optionally disposes a lens within the pedestal of the optical fixture between the input and the output windows. The lens may be positioned within the pedestal such that the optical receiver and the input window, i.e., the window contacting the surface, lie substantially in conjugate planes of the lens. Thus, the lens focuses light emanating from at least a portion of the surface within the field of view of the first window onto the optical receiver, to provide an image of that portion of the surface which is within the field of view of the input optical window.

In another aspect, the invention provides a system for viewing visual information present on a surface. The system includes an optical guide fixture coupled to an optical receiver, such as a digital camera, as described above, and further includes a head-mounted display unit that is operably coupled to the optical receiver. The optical receiver receives visual information within the field of view of a window of the fixture contacting the surface, and transmits data corresponding to this visual information to the head-mounted display unit. One preferred head-mounted display unit includes liquid crystal display (LCD) elements that provide an image of the visual information to a viewer wearing the head-mounted display unit.

According to a further optional aspect of the invention, the head-mounted display unit includes a holder for removably and replaceably attaching the optical guide fixture thereto. This allows a viewer to view a surface, such as a page of a book, by bringing the surface into contact with a window of the optical fixture, and turning the head to scan different portions of the surface.

The system of the invention for viewing visual information can include a control unit that optionally allows altering the contrast polarity and/or the intensity contrast of the image that the head-mounted display unit presents to the viewer.

In another aspect of the invention, the head-mounted display unit includes only one viewing screen that can be placed in front of a selected eye of the viewer, and can be easily moved from one location to another within the display unit, for example, the screen can be moved from a first location corresponding to one eye of the viewer to a second location corresponding to the other eye of the viewer.

Another aspect of the invention optionally mounts at least one corrective lens to the head-mounted display unit to provide additional visual aid to the viewer.

According to another aspect of the invention, a filter, mounted to the head-mounted display unit, filters a selected range of electromagnetic wavelengths of the image presented to the viewer.

In another aspect, one or more prisms, mounted to the head-mounted display unit provide selective deflections of the light rays emanating from an image presented by the head-mounted display unit. Such selective deflections of the light rays can advantageously allow a patient having macular degeneration to view the image without a need to move her eye to focus the image on the functional portions of the retina.

These and other features of the invention are more fully set forth below with reference to the illustrated embodiments, and the accompanying drawings.

ILLUSTRATED EMBODIMENTS

Figure 1:
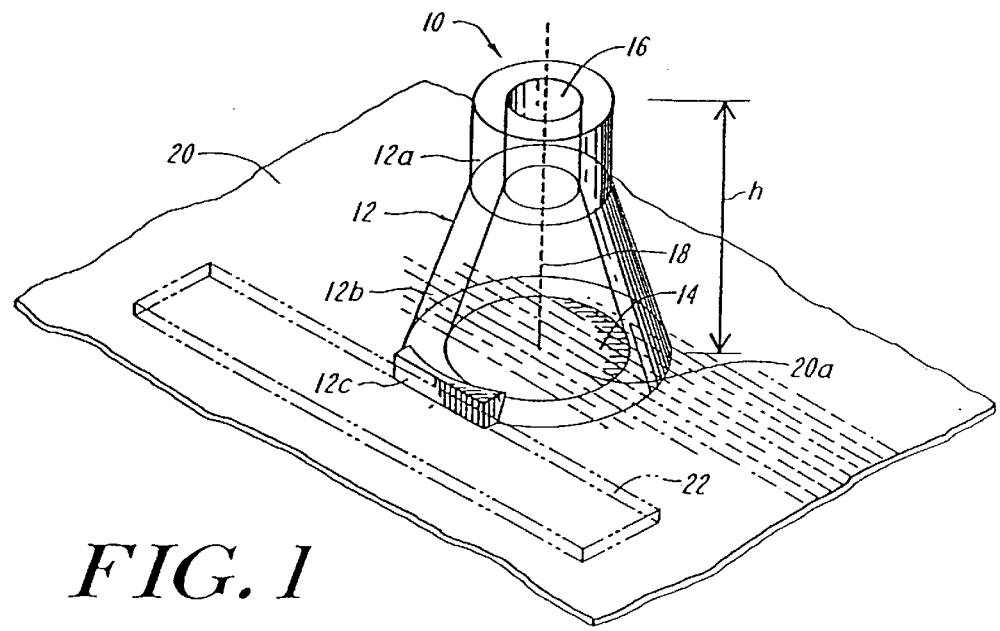
FIG. 1 is a perspective view of an embodiment of an optical guide fixture according to the teachings of the present invention, which is rotationally aligned relative to a surface bearing visual information.

FIG. 1 illustrates an exemplary optical guide fixture 10 according to teachings of the present invention that includes a pedestal 12 having two optical windows, termed an input window 14 and an output window 16, at opposing ends in optical communication with each other. In one embodiment of the guide fixture, the windows 14 and 16 are open apertures, and in another embodiment the windows 14 and 16 are optical apertures formed with an optically transparent material, such as glass, clear plastic, or the like. The windows 14 and 16 are in optical communication with each other along an optical axis 18. In the illustrated fixture 10 of FIG. 1, the pedestal 12 is tubular and the optical axis 18 extends through the hollow interior of the pedestal 12. Further, the illustrated guide fixture 10 has a height (h) that provides a selected optical distance, along the optical axis 18, between the windows 14 and 16.

The exemplary tubular pedestal 12 includes an upper portion 12a extending, from the output window 16, to a lower portion 12b that has a cross-section, transverse to the optical axis 18, that progressively increases in size along the optical axis 18 toward the input window 14. The pedestal 12 further includes a circumferential flat portion 12c, herein referred to as a "flat", on its outer surface in proximity to the input window 14. The flat 12c provides a manually perceptible irregularity that facilitates manual disposition of the optical guide fixture 10 on a surface 20 bearing visual information, such as a text of characters, with the window 14 in a selected rotational orientation relative to the surface 20. The optical guide fixture 10 can be disposed on the surface 20 with the flat 12c abutting against a guide 22, such as a ruler, in a particular rotational orientation. The window 14, when disposed on the surface 20, surrounds a portion 20a of the surface 20. The optical guide fixture 10 couples the visual information within the portion 20a along the optical axis 18 to the output window 16. Thus, a viewer can view the visual information through the second window 16.

Further, the pedestal 12 may be configured to allow external viewing of the portion 20a through the pedestal 12. In the embodiment depicted in FIG. 1, the pedestal may be formed of a transparent material, such as clear plastic or glass, so that the portion of the surface in the viewing window is visible through the pedestal. This advantageously allows selected external positioning of the window 14 on the surface 20, without a need to view the surface 20 through the window 16 for such selected placement.

Figure 2A:
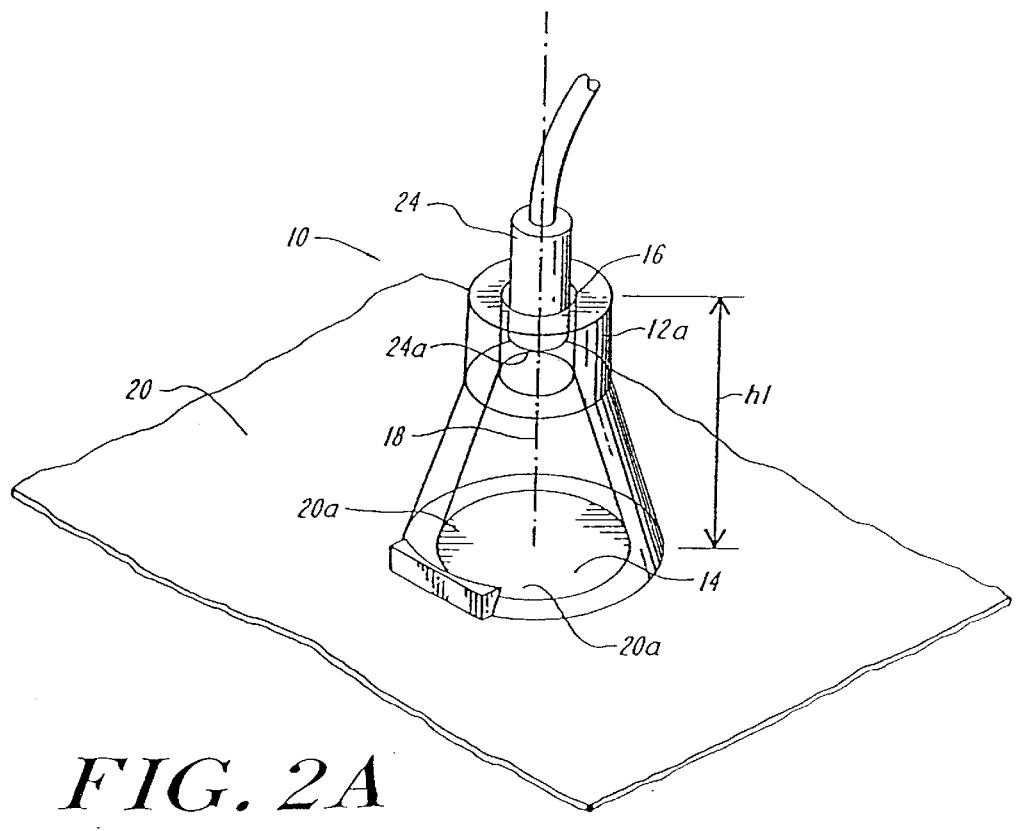
FIG. 2A is another perspective view of the optical guide fixture of FIG. 1, to which an optical receiver is coupled.
Figure 3A:
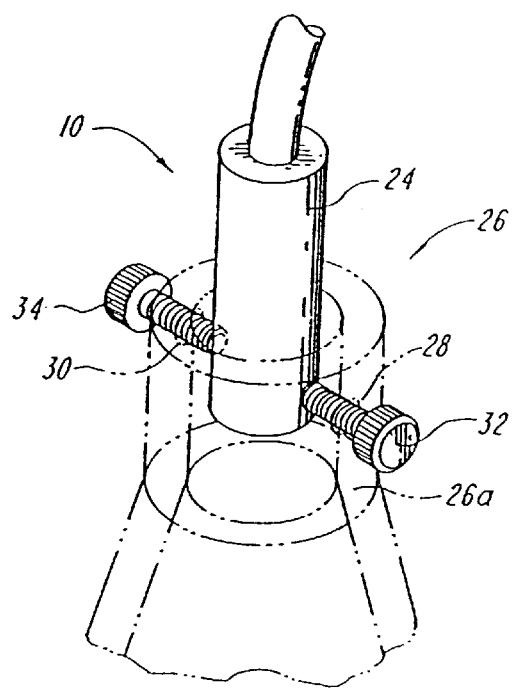
FIG. 3A is a perspective view of an optical guide fixture according to the teachings of the invention having threaded openings therein for two set screws that hold an optical receiver within the pedestal of the fixture.

FIG. 2A illustrates an embodiment wherein the second window 16 is adapted for coupling with an optical receiver 24, such as a digital camera. The optical receiver 24 may be partially inserted into the upper portion 12a, and kept in place by frictional engagement between its outer surface and the inner surface of the upper portion 12a. Alternatively, the optical receiver 24 may be glued, or otherwise fastened or secured, to the upper portion 12a. Those skilled in the art will understand that there are other alternative mechanisms for attaching the optical receiver 24 to an optical guide fixture according to the present invention. For example, FIG. 3A illustrates an optical fixture 26 according to an alternative embodiment of the invention having two threaded openings 28 and 30 in a cylindrical portion 26a thereof for receiving two set screws 32 and 34 for holding the optical receiver 24 within the optical guide fixture 26.

Referring again to FIG. 2A, a detecting surface 24a of the optical receiver 24, engaged with the optical guide fixture 10, such as the surface in which charge coupled device (CCD) elements of a digital camera lie, faces the input window 14, and may be substantially perpendicular to the optical axis 18. Thus, the surface 24a functionally provides the output window of the optical fixture 10. Further, a certain embodiment of the invention places the optical receiver 24 at a selected distance (h1) from the window 14 such that the field of view (FOV) of the optical receiver 24 encompasses the portion 20a of the surface 20 that is encompassed by the window 14, i.e., the FOV of the optical receiver 24 may be selected to correspond to the field of view of the window 14.

Figure 2B:
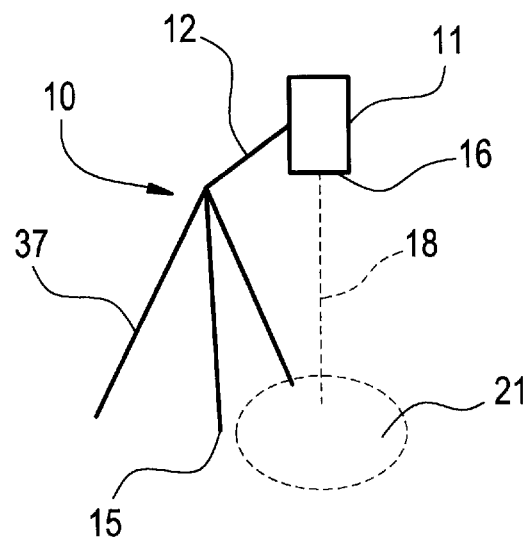
FIGS. 2B and 2C depict alternative embodiments of an optical guide fixture according to teachings of the invention.

FIG. 2B depicts an embodiment wherein the fixture 10 comprises a pedestal 12 having three legs 37 adapted for manually guided translation across a surface. In related embodiments, the pedestal may comprise more than three legs, such as four or five legs. The pedestal is coupled to a mount 11 configured for coupling to an optical receiver, such as a digital camera or other electronic viewing device. The output window 16 may be part of the mount 11, or may be a part of an optical receiver coupled to the mount 11, for example, a lens or detector of an optical receiver. The optical axis 18 in the depicted embodiment lies outside of the base 15 of the pedestal, as defined by the ends of the legs 37. The field of view 21 of the optical receiver partly overlaps with the base 15. In certain such embodiments, the field of view 21 may lie entirely outside the area of the base 15. Preferably, the field of view 21 does not include any part of the pedestal 12, such that the pedestal 12 does not obstruct the field of view 21. In preferred embodiments, the center of gravity of the optical fixture 10, with or without an optical receiver coupled to the mount 11, lies within the base 15, so that the optical fixture 10 remains upright, e.g., is freestanding, in the absence of any external support, such as the grip of a user.

Figure 2C:
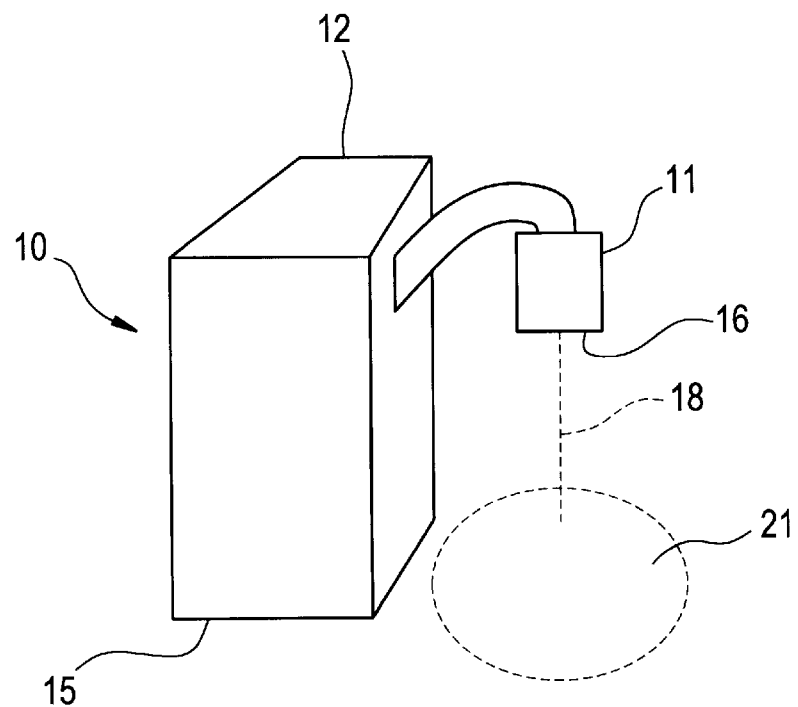

FIG. 2C portrays yet another embodiment of an optical fixture 10, wherein the pedestal 12 comprises a base 15 and is coupled to a mount 11 for coupling to an optical receiver. The output window 16 may be part of the mount 11, or may be a part of an optical receiver coupled to the mount 11, for example, a lens or detector of an optical receiver. The optical axis 18 in the depicted embodiment lies outside of the base 15 of the pedestal. The field of view 21 in the depicted embodiment lies entirely outside the area of the base 15. Preferably, the field of view 21 does not include any part of the pedestal 12, such that the pedestal 12 does not obstruct the field of view 21. In preferred embodiments, the center of gravity of the optical fixture 10, with or without an optical receiver coupled to the mount 11, lies within the base 15, so that the optical fixture 10 remains upright, e.g., is freestanding, in the absence of any external support, such as the grip of a user.

The optical fixtures depicted in FIGS. 2A, 2B, and 2C permit a user to translate an optical receiver over a viewing surface while maintaining the optical receiver in a substantially fixed orientation with respect to distance between the surface and receiver, and with respect to the angle of incidence of the optical axis with the surface. One of ordinary skill in the art will readily comprehend that the optical axis, although uniformly depicted perpendicular to the surface in FIGS. 2A, 2B, and 2C, may define an angle of less than ninety degrees with the surface. In such embodiments, the optical receiver may be configured such that angles which deviate from ninety degrees do not introduce focal problems that might interfere with a user's ability to discern or recognize the features, such as text or images, disposed on the surface. Such problems may be compensating for by, for example, using appropriate lenses, employing computer software capable of correcting for differences in focal length, or by any other suitable means.

Figure 3B:
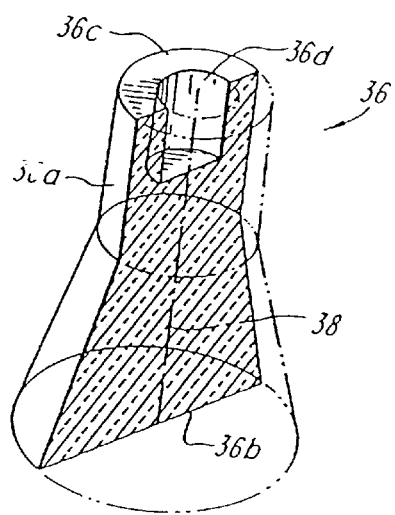
FIG. 3B is a perspective view of a solid optical guide fixture according to the invention formed of an optically transparent material.

FIG. 3B illustrates an optical guide fixture 36 according to an alternative embodiment of the invention having a solid body 36a, formed of an optically transparent material, such as glass or clear plastic. The transparent body 36a allows propagation of light emanating from visual information within the FOV of an input window 36b of the fixture 36 along an optical axis 38 to an output window 36c of the fixture 36. The optical fixture 36 can further include a housing, or similar receiving structure, 36d therein for accommodating and mounting an optical receiver (not shown) for receiving visual information within the FOV of the window 36b.

Figure 3C:
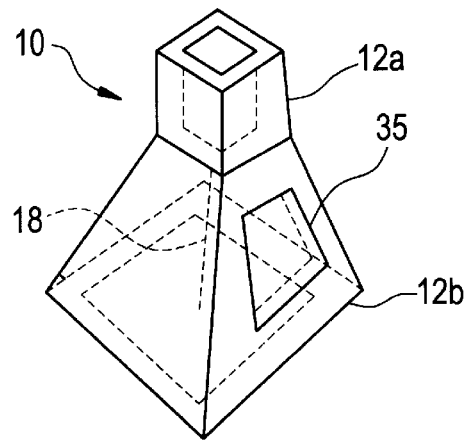
FIGS. 3C, 3D, and 3E are perspective views of three different further embodiments of optical guide fixtures according to teachings of the invention.

FIG. 3C presents an optical guide fixture 10 wherein the walls of the fixture include an aperture 35 through which an implement may be introduced into the viewing area. A fixture of this type permits a user to point to, write on, or otherwise interact with the viewing area, i.e., the input window. Although the depicted fixture includes a single aperture, two or more apertures may be present in the walls of an optical guide fixture according to this embodiment.

Figure 3D:
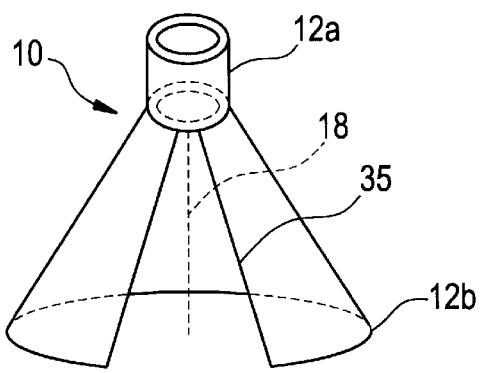

FIG. 3D depicts an alternate embodiment of an optical guide fixture 10 wherein the aperture 35 extends from the base 12b to the upper portion 12a of the fixture. Two or more such apertures may be present in the walls of an optical guide fixture according to this embodiment.

Figure 3E:
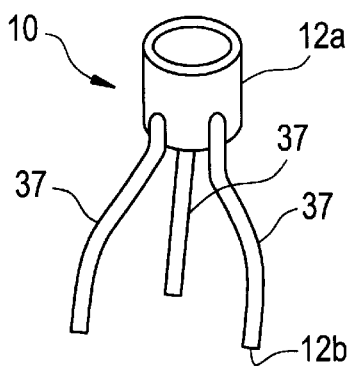

FIG. 3E portrays yet another embodiment of an optical guide fixture, wherein the pedestal is a tripod-like structure having three legs 37. The three legs 37 also constitute the manually engageable guide elements of the optical fixture 10. The lower ends of the legs 37 define, in part, the input window 14. The legs 37 may terminate in a substantially smooth surface, or may terminate in wheels, rollers, or other devices which facilitate movement of the fixture over a viewing surface. Although the depicted embodiment exhibits three legs 37, alternative embodiments with more than three legs are also within the scope of the invention. The legs 37 may be sufficiently stable and rigid to maintain an optical receiver mounted in the upper portion 12a at a substantially constant distance from the viewing surface, and to maintain a constant angle between the viewing surface and the optical axis of the optical receiver as the optical guide fixture is translated along a surface. The legs 37 may be formed of a transparent, translucent, or even opaque material, because the space between the legs permits the viewing area of the optical receiver to be seen.

Figure 4:
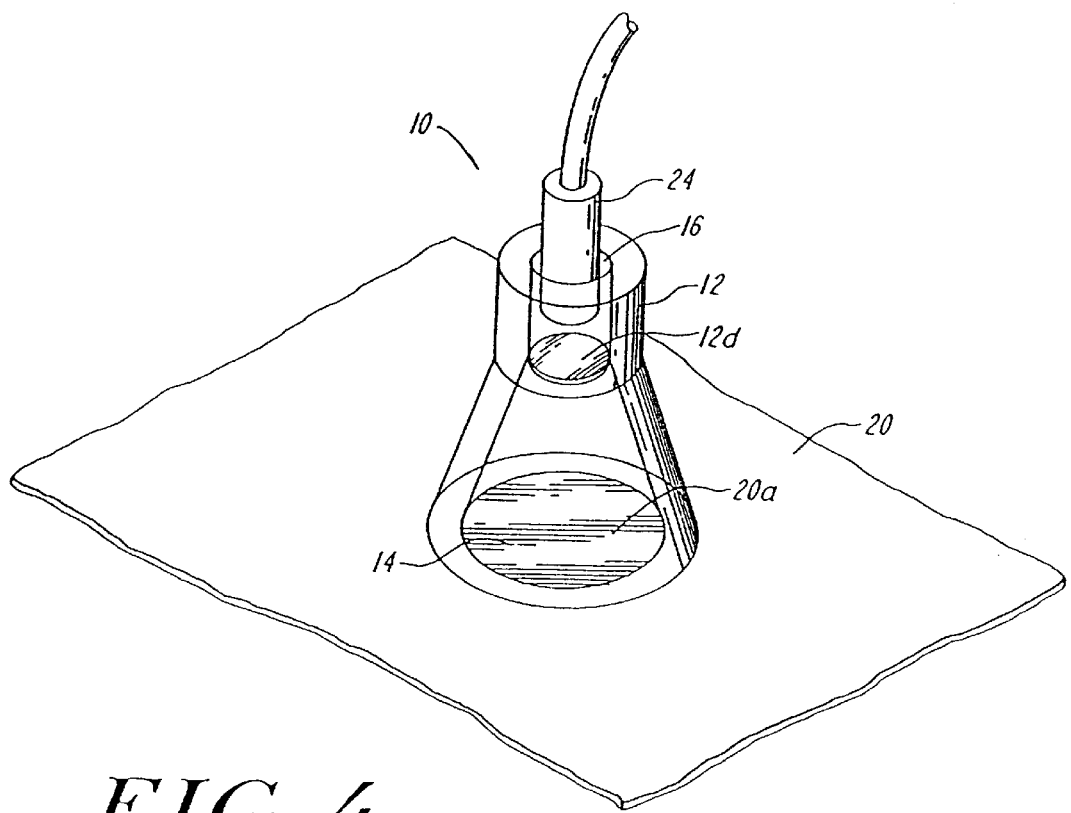
FIG. 4 is a perspective view of the optical guide fixture of FIG. 2 in which a lens is disposed.

FIG. 4 illustrates that one optional aspect of the invention disposes a lens 12d within the pedestal 12 of the optical guide fixture 10. The lens is engaged along the optical axis 18 and is coupled to the optical receiver 24, between the windows 14 and 16. The lens 12d is positioned within the pedestal 12 such that the window 14 and the optical receiver 24 lie substantially in its conjugate planes. The lens 12d focuses light emanating from the portion 20a of the surface 20, which is within the FOV of the window 14, onto the input facet of the optical receiver 24.

Figure 5:
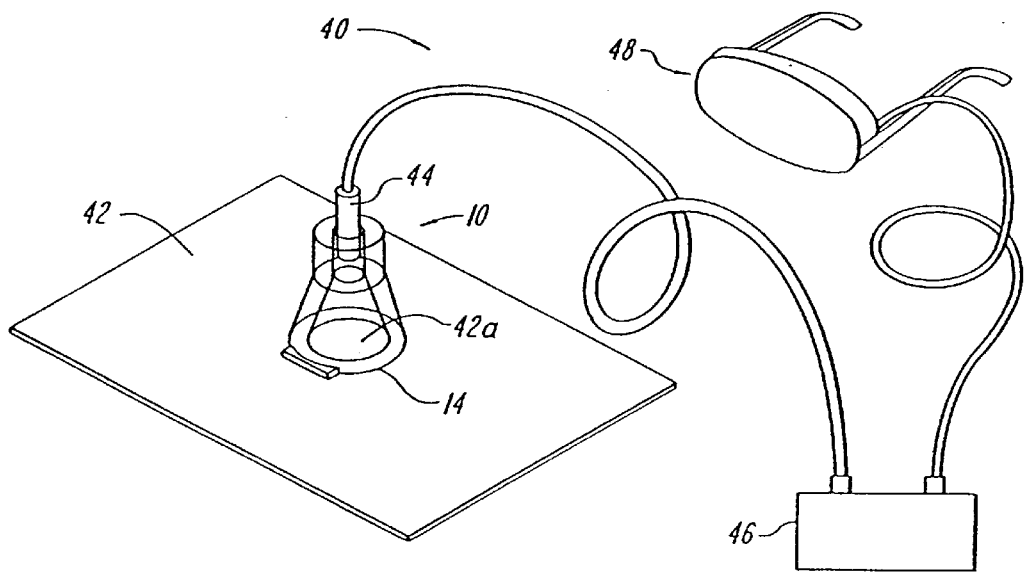
FIG. 5 is a perspective view of a system according to the invention for viewing visual information present on a surface.

With reference to FIG. 5, another aspect of the present invention provides a viewing system 40 for viewing visual information present on a surface 42. The illustrated viewing system 40 includes the optical guide fixture 10, described above, coupled to an optical receiver 44, such as a digital camera. One preferred embodiment of the invention employs as the optical receiver 44 a digital camera produced by Elmo Company of Nagoya, Japan, under the designation QN42H and having a tradename of Super micro color CCD. Those skilled in the art will understand that other digital cameras can also employed as the optical receiver 44. The optical receiver 44 receives visual information in a portion 42a of the surface 42, which is within the field of view of the input window 14 of the optical guide fixture 10, and transmits data corresponding to such visual information to a control unit 46, which in turn transmits the data to a head-mounted display unit 48. The display unit 48 can include, for example, liquid crystal display (LCD) elements for displaying the visual data to a viewer on two screens, each for one eye of the viewer. One preferred embodiment of the system 40 employs as the head-mounted display unit 48 a glasses-type head-mounted display unit and its accompanying control unit produced by Canon Inc. of Tokyo, Japan under the trade designation GT270, or by Sony, Inc. of Tokyo, Japan under the trade designation PLM-A55. The control unit 46 allows selecting the brightness and/or the magnification of an image that the head-mounted display unit presents to a viewer.

Figure 6:
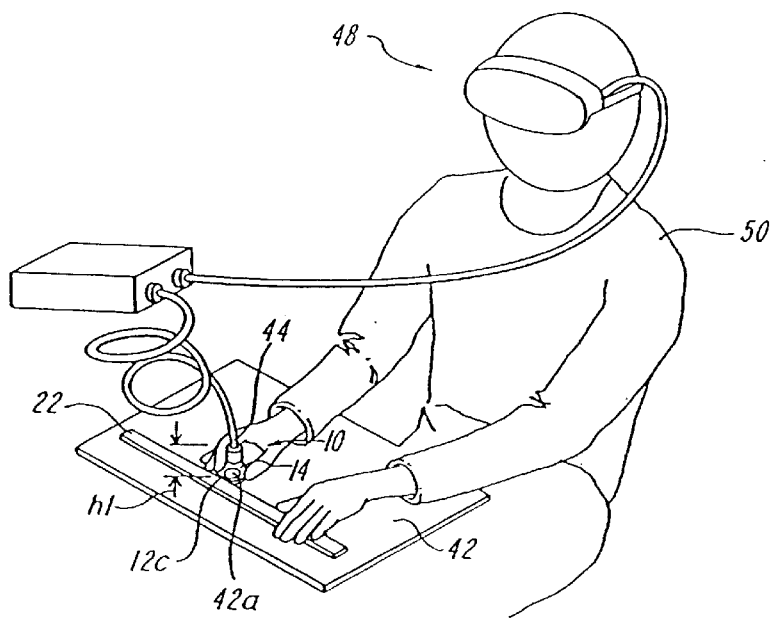
FIG. 6 illustrates a user, such as a patient, employing the system of FIG. 5 for viewing visual information on a surface.

In use, a person, such as a patient with a visual impairment, can employ the system 40 to view visual information, such as text on a surface 42. For example, FIG. 6 illustrates a patient 50 employing the device 40 for reading a page of a book. The patient 50 initially places the input window 14 of the optical guide fixture 10, coupled to the optical receiver 44, on a selected portion of the page in a selected rotational orientation by abutting the flat 12c of the optical fixture 10 against the guide element 22 positioned on the surface 42, or by visually aligning the flat 12c with an edge of the page or with any other alignment indicia. The optical receiver 44 presents visual data corresponding to the visual information within the instantaneous field of view of the window 14 to the head-mounted display unit 48, worn by the patient 50. The head-mounted display unit 48 provides an image of the visual data to the patient. The patient can conveniently translate the optical guide fixture 10 in a selected linear direction and in a selected rotational orientation by sliding the flat 12c against the guide element 22, to view the text on various portions of the surface 42.

With continuing reference to FIG. 6, a distance (h1) between the optical receiver 44 and the input window 14 is selected to be a fixed value such that the portion 42a of the surface 42, which is within the field of view of the window 14, is in the focal plane of the optical receiver 44. This provides a fixed-focus system that obtains a sharp image of a portion of the surface 42 so long as the portion contacts the window 14. Thus, the system 40 does not require any adjustment of the focal length of the optical receiver 44 as the optical fixture 10 is scanned over the surface 42 with the window 14 in contact with the surface 42. Another advantage of the system 40 is that the optically transparent pedestal 12 of the optical guide fixture 10 allows the patient, or another person, to place the optical fixture 10 on a desired location of the surface 42 by externally viewing the surface 42 through the transparent pedestal 12.

Another advantage of the system 40 is that the head-mounted display unit 48, when worn by a patient, follows the head movements of the patient. Thus, the image that the display unit 48 provides to the patient remains in the patient's field of view, even as the patient's head moves. In addition, the system 40 can provide a desired degree of magnification and brightness of an image of visual information on a surface. Further, the system 40 is advantageously portable, light-weight and easy to wear, thus rendering it particularly suited for a visually impaired patient.

Accordingly, one application of the system 40 is to provide magnified images of visual information on a surface, such as printed characters on a page of a book, to a patient who suffers from a visual impairment. Such visual impairments include, but are not limited to, macular degeneration, cataracts, corneal scarring, intra-ocular light scattering, and the like. In particular, the system 40 allows such a visually impaired patient to read small printed characters with a greater ease.

Further, the control unit 46 optionally allows electronically altering the contrast polarity of an image that the head-mounted display unit presents to the viewer. For examples, the control unit can control the head-mounted display to provide an image having a dark background on which bright characters are displayed. Alternatively, the background can be selected to have any desired color, such as blue or orange. Further, the control unit 46 can be optionally configured to electronically enhance the intensity contrast of the image.

Figure 7:
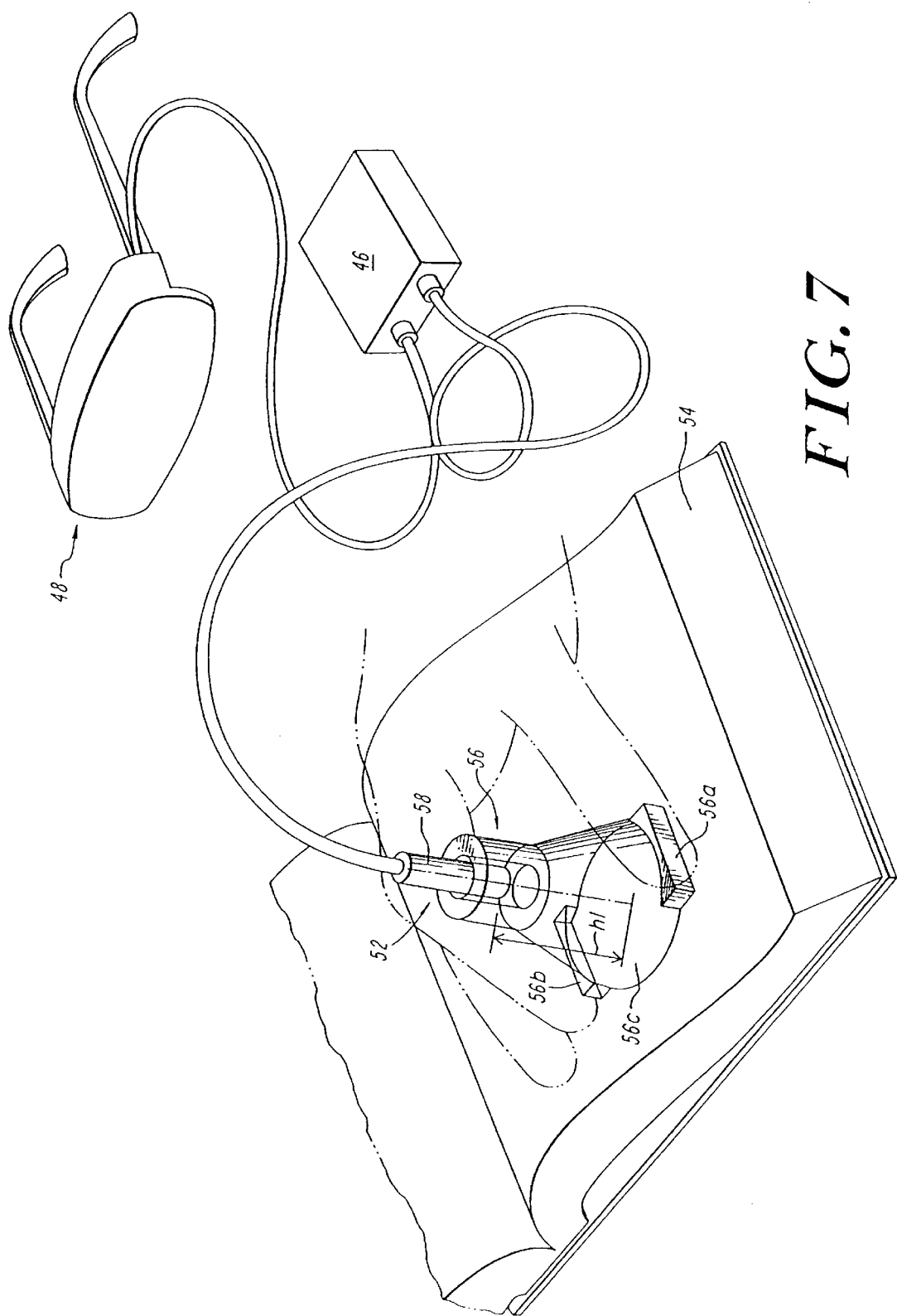
FIG. 7 illustrates a user employing a viewing system according to the invention for viewing visual information present on an uneven surface.

FIG. 7 illustrates that a viewer can employ a viewing system 52 according to the invention to view visual information present on an uneven surface 54. The exemplary device 52 includes an optical guide fixture 56 in accordance with a preferred embodiment of the invention, and further includes the display unit 48 and the control unit 46, described above in connection with the previous embodiment. The optical guide fixture 56 has two circumferentially opposed flats 56a and 56b. The viewer can hold the optical fixture 56 by grabbing the optical flats 56a and 56b, to translate the optical guide fixture 56 over the surface 54 while maintaining a window 56c of the optical guide fixture 56 in contact with the surface 54. A digital camera 58 is coupled to the optical fixture 56 at a fixed selected distance h1 from the window 56c. Hence, as the viewer scans the optical guide fixture 56 over the surface 54, any portion of the surface 54 that is within the instantaneous field of view of the window 56c has a fixed distance h1 from the camera 58, and therefore remains in focus. The digital camera 58 transmits data corresponding to the visual information on the surface 54 to the head-mounted display unit 48 to be viewed by the viewer.

Figure 8:
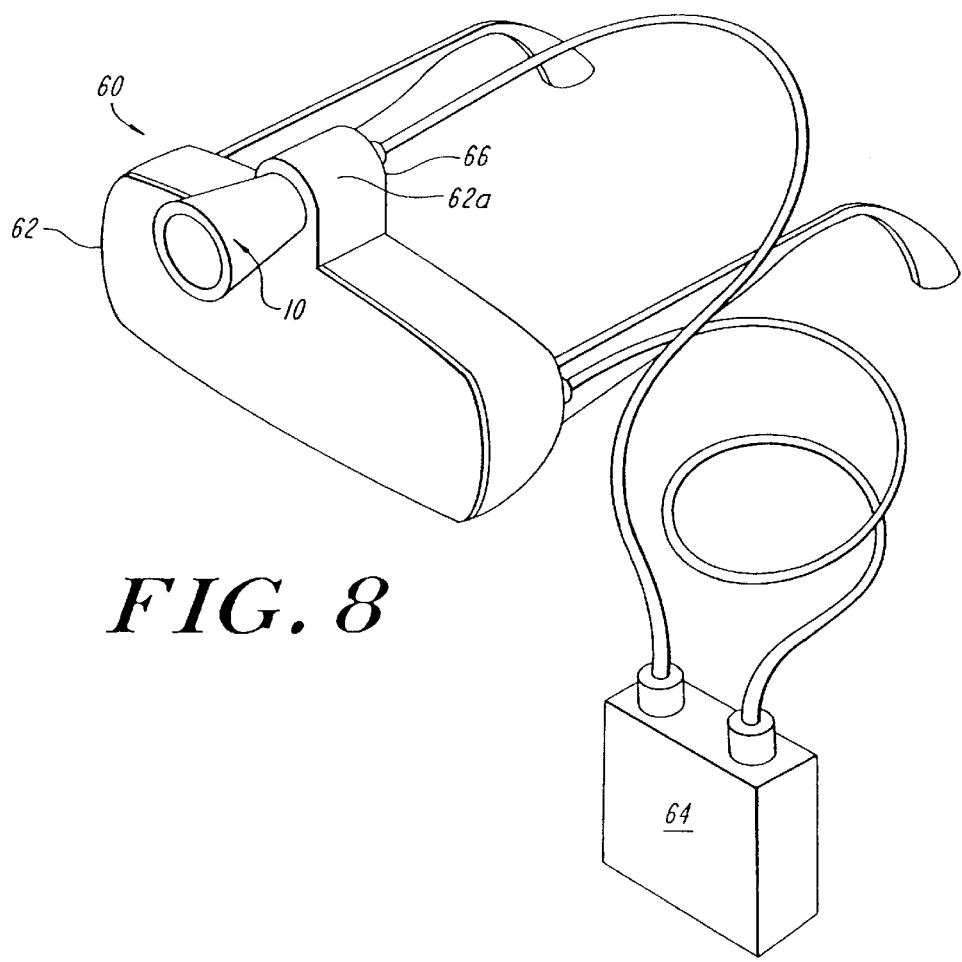
FIG. 8 is a perspective view of a viewing system according to the invention and having a head-mounted display unit that includes a holder for attaching an optical guide fixture of the invention to the display unit.

FIG. 8 illustrates a viewing system 60 according to another preferred embodiment of the invention that includes a head-mounted display unit 62, a control unit 64, and an optical guide fixture in accordance with the teachings of the invention, such as the optical guide fixture 10 described above, coupled to an optical receiver 66. The head-mounted display unit 62 further includes a holder 62a, attached thereto or formed integrally therewith, for removably and replaceably attaching the optical guide fixture 10, with the optical receiver 66 couple thereto, to the display unit 62.

Figure 9:
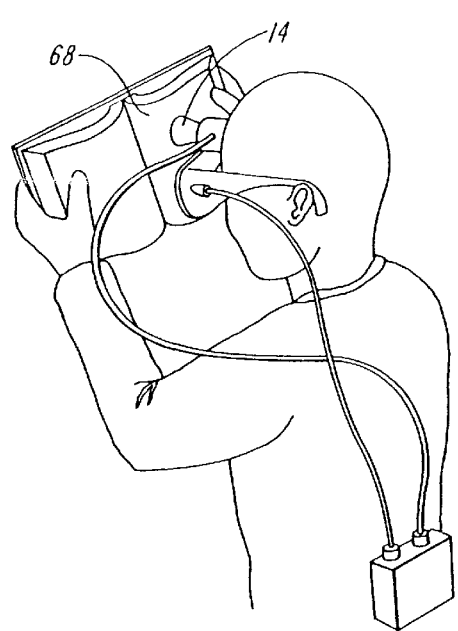
FIG. 9 illustrates a user employing the system of FIG. 8 for viewing visual information present on a surface.

In use, as shown in FIG. 9, a viewer can wear the head-mounted display unit 62 to view visual information present on a surface 68, for example, by bringing the surface 68 into contact with the window 14 of the optical guide fixture 10. Because the optical receiver 66 is positioned at a selected distance, which is substantially equal to its focal length, relative to the window 14, a portion of the surface 68 that is in contact with the window 14 will lie substantially in the focal plane of the optical receiver 66. Hence, the viewer can conveniently scan the surface 68, by either moving the surface 68 relative to optical guide fixture 10 or moving the head relative to the surface 68, while maintaining the window 14 in contact with the surface 68. Maintaining contact between the window 14 and a portion of the surface being examined ensures that the portion of the surface remains in focus. This advantageously eliminates the need for adjusting the focal length of the optical receiver 66, e.g., a digital camera, while the visual information on the surface 68 is being examined. That is, the viewing system 60 of the invention provides a fixed focus system, which is easier and cheaper to produce than many conventional systems that require auto-focusing.

Figure 10:
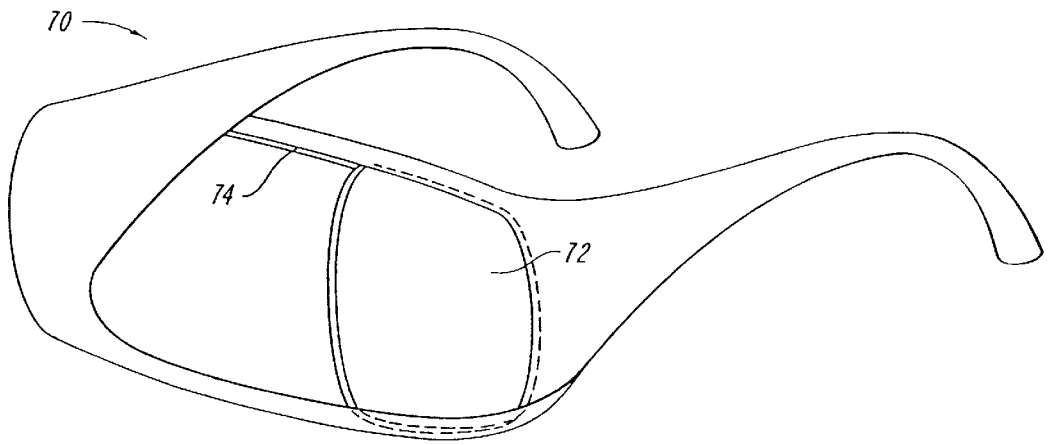
FIG. 10 is a perspective view of a head-mounted display unit for use in a viewing system according to the invention, which includes a viewing screen that can be positioned in front of a selected eye of a viewer, and can be moved from one location within the display unit to another.

FIG. 10 illustrates a head-mounted display unit 70 according to another embodiment of the invention that includes only one screen 72 that can be disposed in front of one eye of a patient for displaying visual information to the patient. In particular, the head-mounted display unit 70 includes a channel 74 in which the screen 72 is engaged. A patient can conveniently move the screen 72 along the channel 74, to place it in front of one eye or the other. A patient typically prefers having the screen 72 in front of the eye having a better visual ability. One advantage of the head-mounted display unit 70 is that while one eye can view the screen 72, the other eye can provide an unobstructed view of the environment to the patient, for example the location whose image the display presents. Those skilled in the art will understand that a head-mounted display unit that allows a patient to select the position of the screen 72 is not limited to the one described above. For example, another alternative head-mounted display unit allows the patient to remove the screen located at one position, e.g., in front of one eye, from the head-mounted display unit, and place it in another position, e.g., in front of the other eye.

Figure 11:
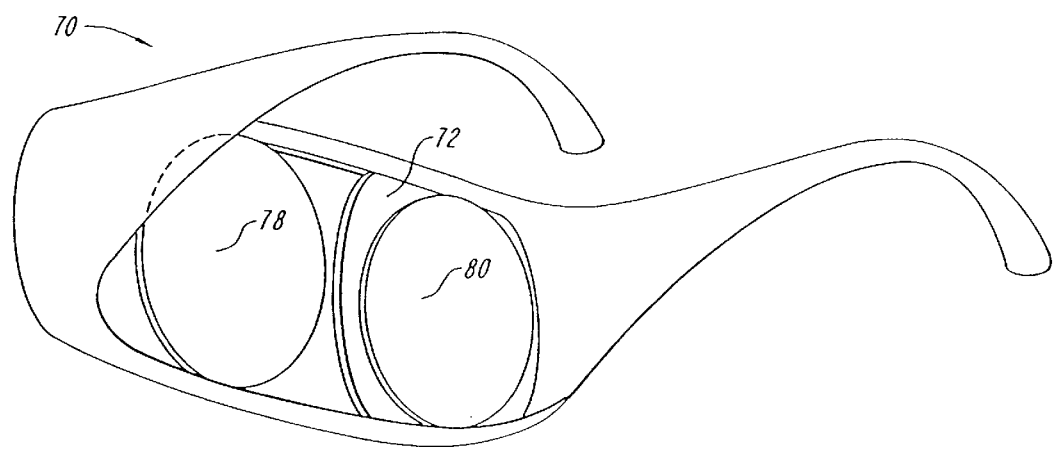
FIG. 11 is a perspective view of another head-mounted display unit according to the invention that includes the viewing screen of the head-mounted display unit of FIG. 10, and further includes two corrective lenses, each mounted to the display unit to be in front of one eye of the viewer, to provide additional visual aid to the viewer.

FIG. 11 illustrates another head-mounted display unit 76 that includes the screen 72 and further includes corrective lenses 78 and 80, positioned such that each corrective lens is placed in front of one eye of the patient when the patient wears the head-mounted display unit 76. This advantageously allows a patient to wear corrective lenses and simultaneously employ the screen 72.

Figure 12:
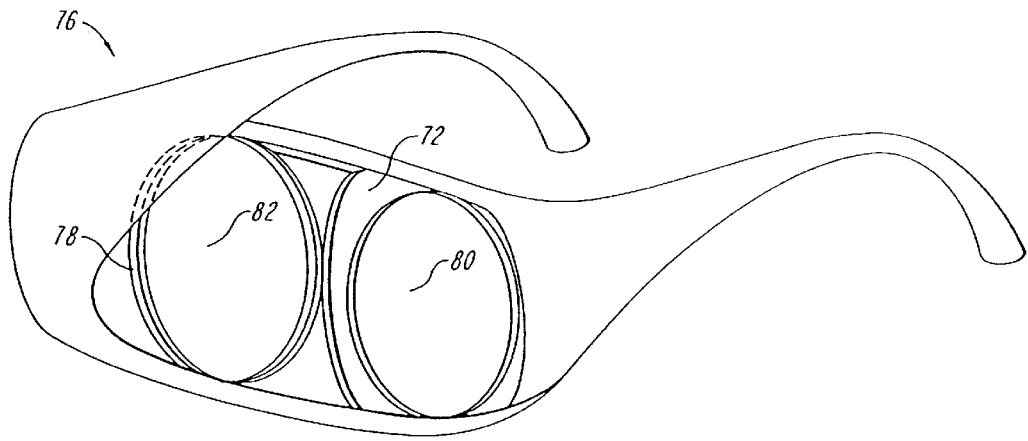
FIG. 12 is another perspective view of the head-mounted display unit of FIG. 11, illustrating a filter mounted to the head-mounted display unit for filtering a selected range of electromagnetic wavelengths.

FIG. 12 illustrates that a filter 82 can be mounted on the head-mounted display unit 76 to filter a selected range of electromagnetic wavelengths. Those skilled in the art will understand that more than one filter can be mounted on a head-mounted display unit according to the invention. For example, two filters, each positioned in front of one eye of a viewer, can provide filtering of a selected range of wavelengths for both eyes.

Figure 13:
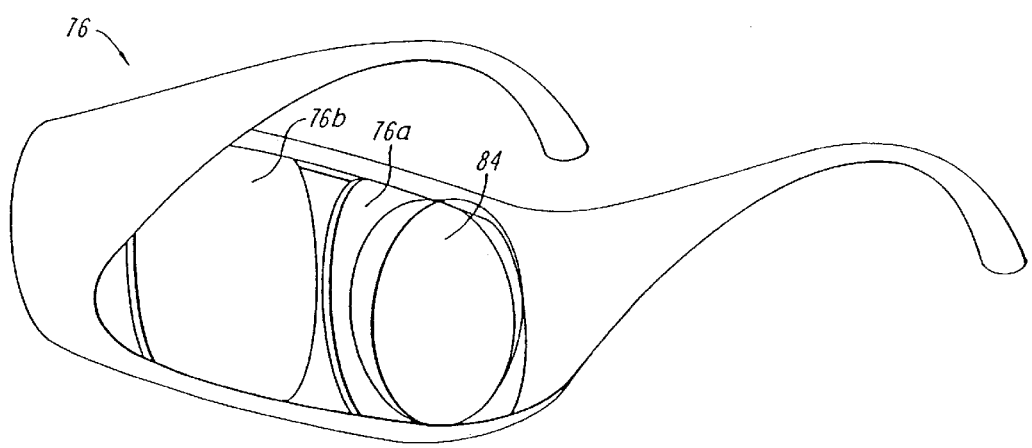
FIG. 13 is a perspective view of another head-mounted display unit according to the invention that includes a prism disposed in front of one screen of the display unit for selectively altering the direction of light rays emanating from an image presented by the screen.

FIG. 13 illustrates an alternative embodiment of the invention in which a prism 84 is mounted to the display unit 76 in front of at least one screen 76a of the display unit 76 to assist a viewer who suffers from macular degeneration to view the image presented on the screen 76a.

Figure 14A:
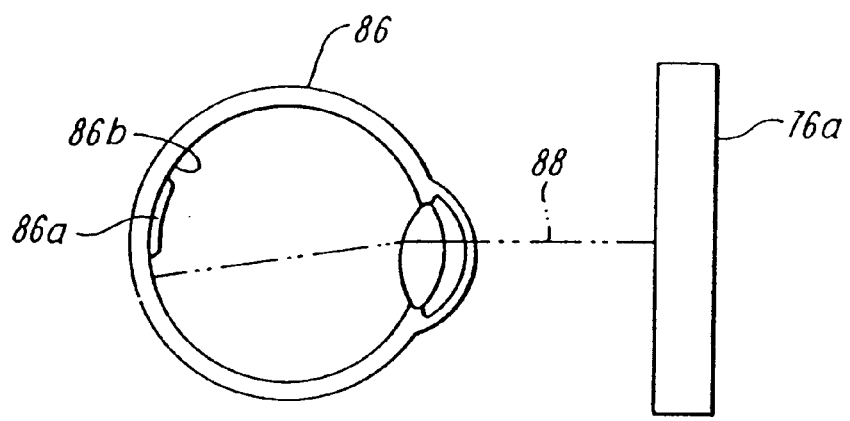
FIG. 14A is a side view of one screen of a display unit according to the invention and an eye of a viewer having macular degeneration and viewing an image presented on the screen.
Figure 14B:
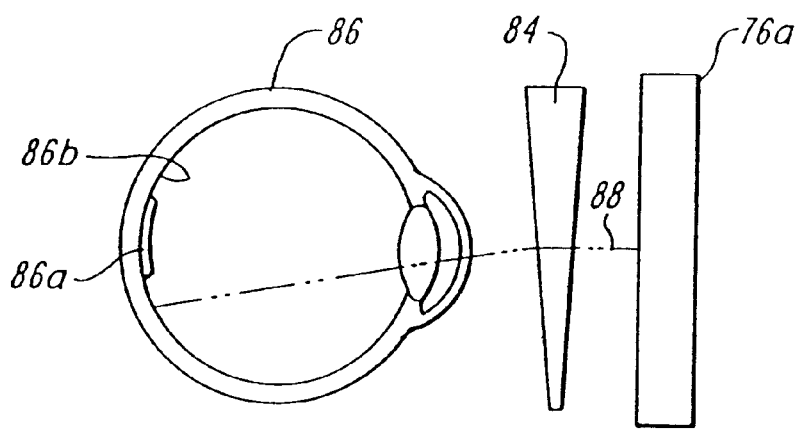
FIG. 14B is a side view of the screen and the eye of the previous figure further illustrating a prism disposed between the eye and the screen to selectively alter the path of light rays emanating from an image on the screen such that the light rays strike functional portions of the retina.

Patients who suffer from pathologies of the macula typically need to move their eyes when viewing a scene to ensure that the image of the scene falls on a portion of the retina that is functional. The prism 84 allows such patients to view the image presented by the display unit 76 of the invention without a need to move their eyes. FIGS. 14A and 14B illustrate better this aspect of the invention. In particular, FIG. 14A illustrates the screen 76a without the prism 84, and further illustrates a viewer's eye 86 disposed in front of the screen 76a for viewing an image presented on the screen 76a. A portion 86a of the viewer's retina 86b suffers from a pathology that renders the portions 86a non-functional. Hence, the viewer has to move the eye 86 to see the light ray 88. In this example, the viewer has oriented the eye 86 downward to ensure that the exemplary light ray 88 emanating from the screen 76a avoids the portion 86a and falls on a functional portion of the retina 86b.

In contrast, FIG. 14B illustrates the screen 76a with the prism 84 disposed in front of it. A ray of light emanating from an image presented on the screen 76a travels through the prism 84 before reaching the viewer's eye 86. The prism 84 alters the path of the light ray 88 such that, upon traveling through the eye 86, it strikes the retina 86b in a location away from the diseased portion 86a, i.e., it strikes a functional portion of the retina. Hence, the viewer can conveniently view the image presented by the screen 76a without a need to move the eye 86.

Those skilled in the art will appreciate that two prisms can be employed in a manner described above if both eyes of a viewer suffer from macular degeneration. Further, if the degeneration of one eye differs from that of the other, each prism can be selected to alter the beam path to provide the required correction for the eye in front of which it is disposed.

While the present invention has been described with reference to above illustrative embodiments, those skilled in the art will appreciate that various changes in form and detail may be made without departing from the intended scope of the present invention as defined in the appended claims.

What is claimed is:

1. An optical guide fixture for coupling visual information present on a surface to an optical receiver, the fixture comprising:
   a pedestal having a base adapted for manually guided translation along the surface, and
   a mount coupled to the pedestal adapted for coupling to an optical receiver having a field of view at a surface substantially at a surface on which said base is disposed,
   whereby the mount maintains an optical receiver at a predetermined distance and angle with respect to the surface when the optical guide fixture is translated along the surface.

2. An optical guide fixture according to claim 1, further comprising an optical receiver having a field of view coupled to the mount.

3. An optical guide fixture according to claim 1, wherein the field of view of an optical receiver coupled to the mount is external to the fixture.

4. An optical guide fixture according to claim 1, wherein the fixture is adapted to permit a removable and replaceable passage of an object into the field of view of an optical receiver coupled to the mount.

5. An optical guide fixture according to claim 1, wherein the field of view of an optical receiver coupled to the mount is substantially unobstructed by an opaque portion of the pedestal.

6. An optical guide fixture for coupling visual information present on a surface to an optical receiver, the fixture comprising:
   a pedestal having at a first axial end an input window adapted for manually guided translation along the surface, and having at a second axial end an output window adapted for coupling to an optical receiver,
   the input window and the output window being in optical alignment along an axially extending optical passage, and the pedestal maintaining the output window at a predetermined distance and angle with respect to the surface when the optical guide fixture is translated along the surface, and
   wherein the pedestal has, between the first and second axial ends, at least one opening for removably and replaceably passing an implement from outside the fixture to the optical passage within the fixture.

7. An optical guide fixture according to claim 6, wherein the input window is larger than the output window.

8. An optical guide fixture according to claim 6, wherein the pedestal comprises one or more walls extending axially from the first axial end to the second axial end.

9. An optical guide fixture according to claim 8, wherein the walls define a conical shape.

10. An optical guide fixture according to claim 6, wherein the pedestal includes at least one aperture having a span transverse to each of the input and output windows for removably and replaceably passing an object into the optical passage from the environment of said fixture, other than through the input or output window.

11. An optical guide fixture according to claim 6, wherein the pedestal includes a region on an outer surface of the pedestal with a manually perceptible surface irregularity.

12. An optical guide fixture according to claim 11, wherein the manually perceptible surface irregularity includes a flat portion for aligning the first axial end of the guide fixture with a translation indicium on the surface.

13. An optical guide fixture according to claim 11, wherein the manually perceptible surface irregularity includes a flat that supports manually translating the first axial end of the pedestal relative to the surface with selected linear and rotational orientations relative to the surface.

14. An optical guide fixture according to claim 6, wherein the pedestal includes at least one further optically transmissive window.

15. An optical guide fixture according to claim 14, wherein the transmissive window comprises an optically transparent material.

16. An optical guide fixture according to claim 6, wherein the pedestal comprises at least three legs extending from the first axial end to the second axial end.

17. An optical guide fixture according to claim 6, further comprising an optical receiver having a predetermined focal length, and coupled to the pedestal such that the optical receiver is spaced from the input window by a distance substantially equal to the focal length, whereby the optical receiver receives an image of at least a portion of the input window.

18. An optical guide fixture according to claim 17, wherein the optical receiver includes a digital camera.

19. An optical guide fixture according to claim 17, wherein the optical receiver has a field of view corresponding to the input window.

20. An optical guide fixture according to claim 6, further comprising an optical receiver coupled to the pedestal, and a lens disposed between the optical receiver and the input window of the pedestal such that the input window and the optical receiver lie substantially in conjugate planes of the lens, wherein the lens focuses light received from at least a portion of the input window onto the optical receiver.

21. A system for viewing visual information present on a surface, comprising:
   a pedestal having at a first axial end an input window adapted for manually guided translation along the surface, and having at a second axial end an output window adapted for coupling to an optical receiver, the input window and the output window being in optical alignment along an axially extending optical passage, and the pedestal maintaining the output window at a predetermined distance and angle with respect to the surface when the pedestal is translated along the surface,
   an optical receiver coupled to the optical passage to provide an image of visual information on the surface within the input window,
   a head-mounted display unit operably coupled to the optical receiver to receive the image and to display the image to a viewer, and
   wherein the pedestal has, between the first and second axial ends, at least one opening for removably and replaceably passing an implement into the optical passage between said input and output windows.

22. A system according to claim 21, wherein the head-mounted display unit includes a closed-circuit television display unit.

23. A system according to claim 22, wherein the closed-circuit television display unit includes a liquid crystal display for displaying the image.

24. A system according to claim 23, wherein the head-mounted display unit includes a holder for removably and replaceably attaching the optical receiver to the head-mounted display unit.

25. A system according to claim 21, wherein the head-mounted display unit includes a viewing screen, the viewing screen and the head-mounted display unit being configured to permit placement of the viewing screen at least at first and second locations within the display unit.

26. A system according to claim 25, wherein the first location corresponds to placement of the screen in front of one eye of the viewer, and the second location corresponds to placement of the screen in front of the other eye of the viewer.

27. A system according to claim 21, further comprising at least one corrective lens disposed in the head-mounted display unit to provide visual aid to the viewer.

28. A system according to claim 21, further comprising at least one filter for filtering a selected range of electromagnetic wavelengths.

29. A system according to claim 21, further comprising a control unit for altering contrast polarity of the image the head-mounted display unit presents to the viewer.

30. A system according to claim 21, further comprising at least one prism mounted to the head-mounted display unit for selectively deflecting light rays emanating from the image.

31. A method for providing an image of a selected portion of a surface bearing visual information to a viewer, the method comprising the steps of:
   providing an optical guide fixture comprising a pedestal having at a first axial end an input window adapted for manually guided translation along the surface, and having at a second axial end an output window adapted for coupling to an optical receiver, the input window and the output window being in optical alignment along an axially extending optical passage, and the pedestal maintaining the output window at a predetermined distance and angle with respect to the surface when the optical guide fixture is translated along the surface, and wherein the pedestal has, between the first and second axial ends, at least one opening for removably and replaceably passing an implement from outside the fixture to the optical passage within the fixture,
   coupling an optical receiver to the output window of the optical fixture for receiving visual information present at the input window and producing data corresponding to the received visual information, and
   coupling a head-mounted display unit to the optical receiver to receive the data and display the data to a viewer.

32. An optical guide fixture adapted for imaging visual information present on a surface, the fixture comprising:
   housing means for housing an imaging means for detecting visual information present on the surface, the imaging means having a field of view at the surface,
   guide means coupled to the housing means for contacting the surface and being translated along the surface while maintaining the imaging means at a predetermined distance and angle with respect to the surface, and
   aperture means for passing an object into the field of view of the imaging means when the guide means is disposed on the surface.

33. An optical guide fixture according to claim 32, wherein visual information in the field of view of the optical receiver is visible external to the guide means.

* * * * *